Figure 1:
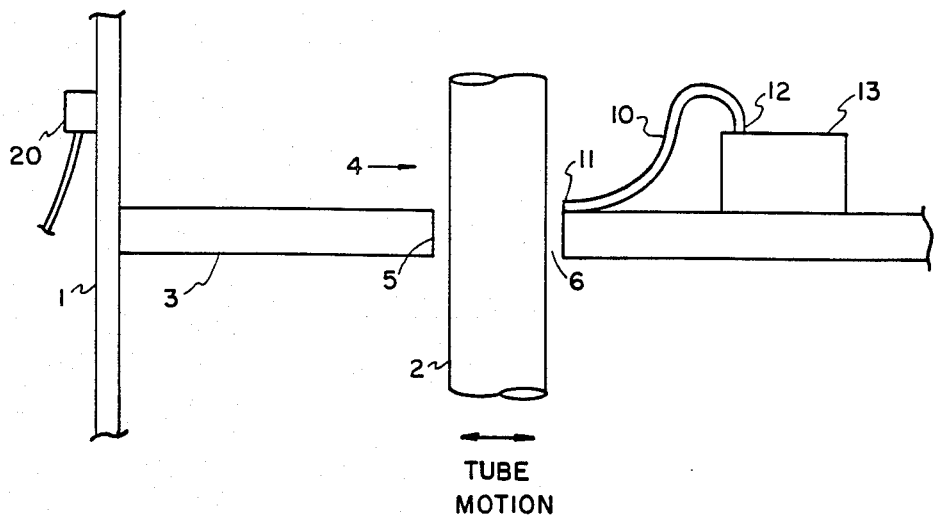

United States Patent [19]

Lubin et al.

[11] Patent Number: 4,523,466
[45] Date of Patent: Jun. 18, 1985

[54] ACOUSTIC MONITORING OF TUBE VIBRATION

[75] Inventors: Barry T. Lubin, Hartford; James P. Thompson, Suffield, both of Conn.

[73] Assignee: Combustion Engineering, Inc., Windsor, Conn.

[21] Appl. No.: 546,773

[22] Filed: Oct. 31, 1983

[51] Int. Cl.³ .......................................... G05D 19/00
[52] U.S. Cl. ................................. 73/579; 116/70; 116/112; 165/11 R; 165/40; 376/245
[58] Field of Search ............... 73/579, 584; 165/11 R; 376/245, 252, 258; 116/70, 112

[56] References Cited

U.S. PATENT DOCUMENTS 3,106,092 10/1963 Shapiro ............................ 165/11 R Primary Examiner—Stewart J. Levy
Assistant Examiner—John E. Chapman, Jr.
Attorney, Agent, or Firm—Arthur L. Wade

[57] ABSTRACT

The tubes of tube and shell heat exchangers destructively vibrate at certain velocities with which fluid flows over their outside surfaces. An acoustic generator is positioned to respond to the fluid vibrations generated by the tubes. The structure of the acoustic generator is sized and arranged to produce a modulated tone representative of tube vibration. A detector mounted external the heat exchanger shell responds to the tone to initiate corrective action which will reduce the tube vibration.

5 Claims, 2 Drawing Figures

ACOUSTIC MONITORING OF TUBE VIBRATION

TECHNICAL FIELD

The present invention relates to the transduction of tube vibration into sound. More particularly, the invention relates to detecting a predetermined frequency of critical tube vibration within a shell and tube heat exchanger by transducing the vibration of the tubes into an acoustic signal with a modulated tone representative of the critical vibration.

BACKGROUND ART

Tube and shell heat exchangers come in many forms and sizes. The shell can be a simple cylinder in form and a series of parallel tubes can extend through the cylinder. Openings in the cylindrical shell can flow fluids into, through, and out of the shell while a second fluid is flowed through the tubes. Any differential in temperature between the two fluids causes an exchange of heat through the tubes walls. It will be convenient to refer to the fluid flowing through the tubes as the primary fluid, and the fluid flowing through the shell as the secondary fluid.

Enhancement of the heat exchange can be brought about by periodically mounting baffles extending transverse the axis of the tubes and forming openings through the baffles so that the secondary fluid will be directed to flow transverse the tube axis, weaving its way from the shell inlet to the shell outlet. In this arrangement, the secondary fluid is provided with greater contact time with the external surfaces of the tubes than if no baffling were present.

Of course, the tubes must penetrate the flow-control baffles, and there must be some degree of clearance between the baffle holes and tube surfaces. Thermal expansion and contraction between the baffles and the tubes must be accommodated by this clearance. Obviously, there will be some degree of secondary fluid leakage between these holes and tube surfaces. The baffle structure is a support to the tubes, as well as a guide for the secondary fluid. The velocity of the secondary fluid over the tube surfaces generates transverse forces on the tubes which cause them to vibrate. These vibrations will cause a variation in the leakage of secondary flow through the holes in the baffle plate. This variation in leakage flow is related to the vibratory motion of the tubes.

There are other forms of shell and tube heat exchangers, a dramatic example being the steam generators of nuclear reactors. In the nuclear steam generator, the vertically extended cylindrical shell has a tube sheet and partition close to the lower end, forming two compartments below the tube sheet which are communicated with tubes bent into a U-shape within the upper part of the shell above the tube sheet. In this form of exchanger, the fluid heated by nuclear fission is flowed through the tubes as primary fluid. The fluid flowed through the shell side of the tubes will be referred to as the secondary fluid and is heated by the primary fluid in the tubes. The tubes are supported within the shell by various forms of baffles/frameworks extended transverse the axis of the tubes. Regardless of the exchanger structure size, and the quantity of the fluids brought into heat exchange relationship, the secondary fluid flowing along the outside surfaces of the tubes can reach the velocity resulting in critical vibration of the tube, causing destructive contact with the baffle/framework structure.

It is the present practice to attach vibration-detecting devices to the external surface of the tubes and transmit vibration signals from these devices to a point external the shell. Typically, a piezoelectric transducer in incorporated into what is termed an accelerometer to form this primary element. These primary elements must transmit their output signals through electrical conductors and are, therefore, subject to the hazards of at least temperature and mechanical connection to receivers external the shells. These devices are far too fragile for the severe service of the heat exchanger. A more simple, direct, rugged primary element is required to respond to the fluid flow variations generated by the tube vibration.

DISCLOSURE OF THE INVENTION

The present invention contemplates an acoustic generator mounted within the shell of a tube and shell heat exchanger, the generator communicated with the fluid flow pulsations generated between a vibrating tube surface and the inner surface of the baffle hole through which the tube extends. The structure of the generator is sized and arranged to respond to a predetermined frequency of tube vibration by emitting a tone having a frequency and/or amplitude high enough to be sensed by a receiver or detector external the shell of the heat exchanger.

The invention further contemplates the acoustic generator mounted on the baffle and extending a fluid pressure transmitting conduit to the space between the vibrating tube and the inner surface of the baffle hole through which the tube extends.

The invention further contemplates a system of control for the secondary fluid velocity which modifies the velocity in accordance with the acoustic signal to avoid destruction of the tube.

Other objects, advantages and features of this invention will become apparent to one skilled in the art upon consideration of the written specification, appended claims, and attached drawings.

BRIEF DESIGNATION OF THE DRAWINGS

Figure 2:
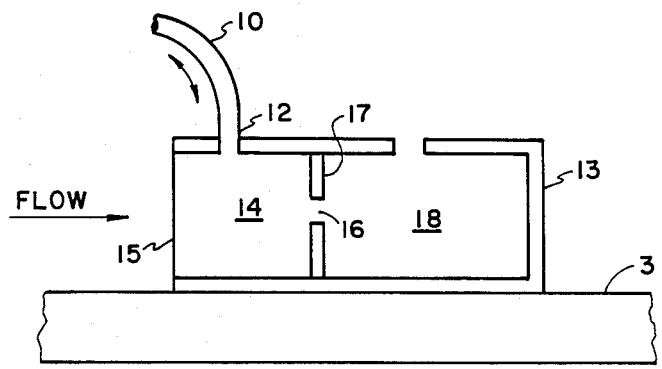

FIG. 1 is a sectioned elevation of a single tube and baffle within a heat exchanger and an acoustic generator communicated with the space between the wall of the tube and the inner surface of the baffle hole embodying the present invention; and FIG. 2 is a sectioned elevation of the acoustic generator of FIG. 1.

BEST MODE FOR CARRYING OUT THE INVENTION

Terms And Technology

In disclosing the present invention it will be recognized that fluids flowing over the external surfaces of tubes can reach velocities at which transverse forces are generated on the tubes and cause destructive tube vibration. The more specific environment of the disclosure will be the tubes of a tube and shell heat exchanger. It is certain critical velocities of the secondary fluid flow within the shell and over the external surface of the tubes which will cause their destructive vibrations.

As previously stated, it is the general object of the invention to transduce the destructive frequency of tube vibration into an audible signal which can be used as a guide for attenuating the velocity of the secondary fluid and thereby obviate the critical tube vibration. Therefore, the structure with which the transduction will be accomplished is broadly termed an acoustic generator. Perhaps, colloquially, the term "whistle" may be utilized as a substitute for acoustic generator. In any event, the generator or whistle will produce a tone which will have the amplitude for transmission from within the shell of the exchanger to an external detector. The detector will be some form of microphone which can initiate a series of events ending in a modification of the velocity of the secondary fluid flow and, therefore, reduction of the destructive tube vibration.

Mounted within the heat exchanger shell, the acoustic generator will be arranged to directly respond to the variation in velocity of the fluid flowing through the clearance between the vibrating tube and one of its supports within the shell. Thus, the mechanical vibration of the tube will produce pressure pulsations of the fluid adjacent the tube surface and this energy will be transmitted to the acoustic generator wherein it will be transduced into a tone within a predetermined acoustic range. It is this tone which will be produced at a frequency and/or amplitude high enough to complete the communication with the external detector against all background noise.

The acoustic generator or whistle will essentially comprise a pair of chambers separated by a partition having an orifice. A flow of fluid is directed into the first chamber, through the orifice and from the second chamber. The turbulence created in the fluid flowing over the orifice edge generates white sound. The first chamber also receives the fluid pulsations generated by the tube. This pulsating fluid energy will be transferred to the fluid flowing through the orifice to modulate the white sound produced into the second chamber. The second chamber is sized to resonate with a predetermined harmonic of the modulated white sound and thereby produce a modulated tone representative of the critical tube vibration. The output tone of the second chamber is directed through the fluid within the shell, and through the shell wall to be received by the detector mounted external the shell.

The Drawings In Detail

FIGS. 1 and 2 are to be taken together. Only a fragment of a tube and shell heat exchanger is disclosed in FIG. 1. The shell is indicated at 1 and the tubes are represented by the single tube 2. A plurality of tubes may be described as being parallel to each other and held in spatial relationship by some form of framework 3. Whatever specific form of supporting framework may be employed, it is assumed the framework acts as a baffle for directing secondary fluid 4 flowing over the external surface of tube 2. Necessarily, the support structure or baffle 3 is extended transverse the axis of tube 2, and therefore, provides an aperture 5 through which tube 2 extends.

Aperture 5 must be sized and arranged to accommodate tube 2, but must have clearance or space 6 to permit relative movement of the baffle and tube in response to at least the temperature forces. Therefore, space 6 provides an opening through which some secondary fluid leaks away from the diverting path formed by the baffle. It is the flow of this secondary fluid leakage in space 6 which the present invention utilizes. The vibration of tube 2 changes the size of space 6 and, therefore, the velocity of the secondary fluid flow leaking through space 6. The pulsating pressure generated by the pulsing velocity of secondary fluid leakage becomes a transduction of tube 2 vibration frequency.

A tube 10 is mounted to position its first end 11 adjacent or into space 6 so that the pressure pulsations of the secondary fluid in space 6 will be transmitted into the first end 11 and travel up tube 10 as a conduit. An acoustic generator is communicated with the second end 12 of tube 10. Acoustic generator 13 is mounted within shell 1 to receive the fluid pressure pulsations of tube 10. Generator or whistle 13 is disclosed as mounted on support structure 3 with tube 10 extending from it down to space 6.

Although generator 13 is disclosed as mounted specifically on baffle 3, it could be mounted anywhere within shell 1. Wherever generator 13 is mounted, it is oriented to receive a flow of secondary fluid in the chamber of the generator which is also connected to conduit 10. Thus, the pressure variations in conduit 10 are imposed upon the secondary fluid flowing through the generator, as disclosed in FIG. 2.

Referring to FIG. 2, a first chamber 14 is provided within the housing of generator 13 and communicated with second tube end 12 in order for the fluid pressure pulsations of tube 10 to be received. The secondary fluid flowing into first chamber 14 through an opening 15 flows through orifice 16 in partition 17 in reaching second chamber 18 within the housing of generator 13. As the fluid flows from the first chamber of the generator into the second chamber through the orifice communicating the chambers, the pressure pulsations of the fluid in tube 10 modulates the white sound created by the sharp edge of orifice 16. The second chamber is sized to resonate with a predetermined harmonic of the white sound at the edge of orifice 16.

The size and arrangement of chamber 18 are selected to establish a tone of frequency and/or amplitude representative of the critical, destructive vibration of tube 2. This tone is provided the amplitude which can travel through the secondary fluid and heat exchanger shell to reach a detector 20 which will distinguish the tone over all background noise present. Once detected, the modulated tone can initiate, directly or indirectly, corrective action. The corrective action can be a change in the velocity of secondary fluid through the heat exchanger to attenuate the vibration of tube 2.

Conclusion

Faced with the prior art limitation of detecting tube vibration by direct, mechanical contact with the tube, the present invention provides the alternate of sensing a secondary movement. To directly attach a primary element to the vibrating tube invites destruction, or at least rapid deterioration, of the element. Alternatively, the pulsing pressure generated by the vibrating tube in contiguous liquid flow can be readily transduced by an acoustic generator into a tone which will travel through intervening liquid and metallic barriers to reach a microphone safely mounted external the severe environment of the vibrating tube. The result is a rugged, stable system without moving mechanical parts.

Let us go over the ground one final time. The vibrating member, specifically the tube of a heat exchanger, reaches a critical, destructive frequency. A flow of liquid external the tube is captured in a space which enlarges and decreases with the tube vibration. The velocity of the flow of liquid through the space of varying dimension, pulses. The pulsing flow generates pulsing pressure waves. A path is provided for these pulsing pressure waves and that path leads to an acoustic generator. The acoustic generator has no moving mechanical structure, it operates on the basic principle of a whistle in providing a receiving chamber for a power fluid, an orifice as an exit from the receiving chamber, and a resonant chamber receiving the fluid exiting the orifice. Of course, the orifice is through a partition between the two chambers and the resonant chamber has an exit for the power fluid. In the specific disclosure of the invention, the power fluid is the secondary fluid of the heat exchanger and the acoustic generator is positioned to receive the flow. As the power fluid flows through the orifice, it is destabilized, the vortices shedding from the orifice edge into the resonant chamber. Superimposed upon the turbulance of shedding vortices, the present invention imposes pulsating pressure waves representative of the tube vibration. Next, the resonant chamber is sized and arranged to resonate with a predetermined harmonic of the white sound generated by the orifice and, thus, establish a modulated tone representative of the critical tube vibration.

The final scene develops with the transmission of the tone through the secondary fluid within the shell and through the wall of the shell to reach a microphone external the shell. Once the microphone has been reached, manifestation of the tone is a straightforward matter. The output of the microphone can be amplified and demodulated as desired, or used to generate a signal which can be converted into a control force applied to regulate the forces which control the tube vibration. As a practical matter, in the present disclosure this will mean an adjustment of the flow rate of the secondary fluid to attenuate the tube vibration into a safe range.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A system for detecting a predetermined frequency of vibration by a tube subjected to fluid forces, including,
    a tube,
    a fluid flowing over the external surface of the tube at a velocity which forces the tube to vibrate at a predetermined frequency,
    a support structure for the tube extending generally transverse the tube axis and providing a hole through which the tube extends with a space between the external wall of the tube and the sides of the hole through the support structure,
    a leakage flow of the fluid through the space between the external wall of the tube and the hole sides,
    a tube-conduit mounted to extend its first open end to the leakage space and receiving the fluid pressure variations through the first opening and up the length of the tube-conduit,
    an acoustic generator communicating with the second end of the tube-conduit to receive the fluid pressure variations and transduce the pressure variations into an acoustic signal output, and
    a detector-receiver mounted external the tube environment and positioned to receive the acoustic signal as representative of the predetermined vibration frequency of the tube.

2. The system of claim 1, wherein,
    the tube is one of a plurality of tubes mounted within a shell to form a tube and shell heat exchanger.

3. The system of claim 2, wherein,
    the acoustic generator is mounted on the support structure for the tube within the shell.

4. The system of claim 3, wherein,
    the detector of the acoustic signal is mounted external the shell.

5. The system of claim 4 wherein the acoustic generator comprises,
    a housing,
    a partition within the housing dividing the housing into two chambers,
    an orifice in the dividing partition,
    a fluid flowing through the orifice creating white sound at the orifice edge,
    a communication between the tube-conduit and a first of the housing chambers to transmit the fluid pressure variations to the fluid flowing through the orifice,
    and the second chamber sized to cause the second chamber to resonate with a predetermined harmonic of the white sound to produce the modulated acoustic signal representative of the tube vibration.

* * * * *